(No Model.)

J. B. HENCK, Jr.
ELECTRICAL CONNECTOR.

No. 526,078. Patented Sept. 18, 1894.

Witnesses:
Frank Silliman Jr
Herbert E Bowen

Inventor:
John B. Henck, Jr.

UNITED STATES PATENT OFFICE.

JOHN B. HENCK, JR., OF BROOKLYN, NEW YORK.

ELECTRICAL CONNECTOR.

SPECIFICATION forming part of Letters Patent No. 526,078, dated September 18, 1894.

Application filed July 6, 1894. Serial No. 516,730. (No model.)

*To all whom it may concern:*

Be it known that I, JOHN B. HENCK, Jr., a citizen of the United States of America, and a resident of the city of Brooklyn, county of Kings, and State of New York, have invented a new and useful Improvement in Electrical Connectors, of which the following is a specification.

My improvement relates to the class of devices intended to facilitate the ready connection and disconnection of electric conductors which are applied to uses requiring their occasional temporary connection, and especially those whose use may require the indiscriminate connection of any two out of an indefinite number of conductors. Such a case occurs, for example, in the connection of the conductors attached to railway cars, for the purpose of uniting into one system the electric signaling or lighting devices of the several cars temporarily associated to form a train. The device is, however, not confined to any particular use, but is equally applicable to any case where two conductors have to be temporarily connected together.

The faults of previous devices for the same purpose, which the present invention aims to overcome, have been that such previous devices have been made in complementary but dissimilar forms, such as are technically known as "male and female," or "right and left," so that if two similar ones happened to be brought together the connection could not be made; or they have been of such form that some part of the conductor, or metal parts connected therewith, was exposed to accidental contact with other conductors in in the neighborhood, or with the hands of the operator engaged in making the connection or disconnection; or they have been of more or less clumsy, or inconvenient, or expensive construction.

The present device is so constructed that every individual connector, of any given size and class of use, is similar in form to every other of the same size and class, so that any two of the same size and class, which may happen to be brought together, will fit each other. The conductors, and all metal parts in connection therewith, are so completely inclosed by non-conducting materials, that accidental contact with them is practically impossible. The device is easily and cheaply made, convenient of use, and of neat and pleasing form.

Figure 1:
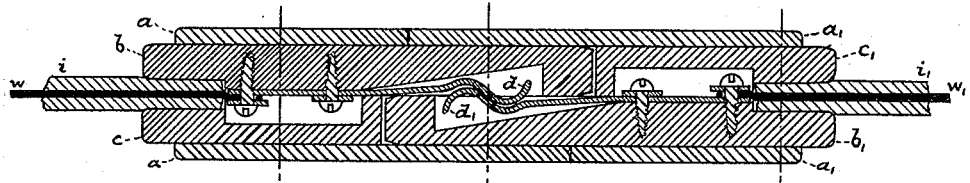
Figure 2:
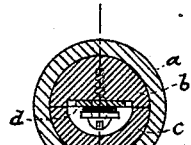
Figure 3:
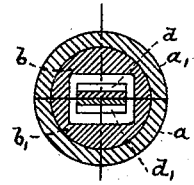
Figure 4:
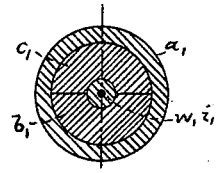
Figure 5:
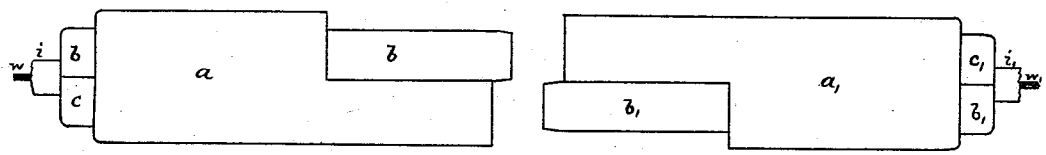
Figure 6:
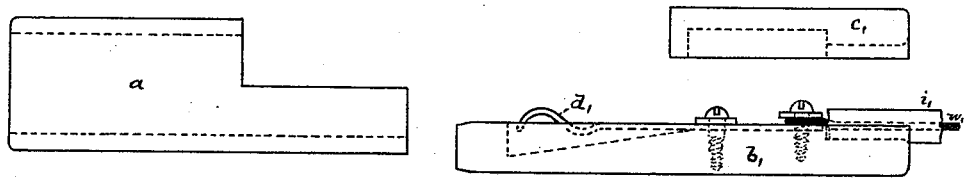
Figure 7:
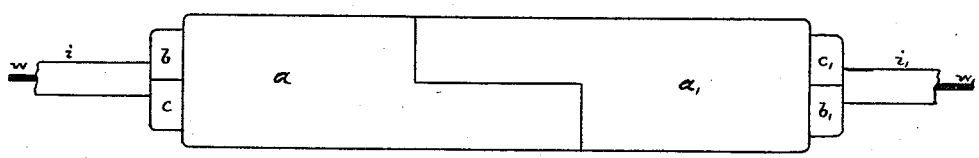

Referring to the accompanying drawings, Figure 1 shows a longitudinal section of two connectors in the position of mutual engagement. Figs. 2, 3, and 4 show transverse sections through the planes indicated by the several lines extending from these figures through Fig. 1. Fig. 5 is an external view of the same two connectors, disengaged from each other. Fig 6. shows the parts of which a connector is composed, sufficiently detached to show the form of each part, and the manner of connecting the device to the end of a conductor. Fig. 7 is an external view of two connectors in the same position as in the section, Fig. 1.

In each of these figures, $a$ is an inclosing tube, having one half of its transverse section cut away, through a portion of its length, as particularly shown in Fig. 6.

$b$ is a semi-cylindrical piece, filling one half the internal cavity or bore of the tube $a$, and cut away, internally, as shown, for the reception of the end of the conductor $w$, with its insulating covering $i$, and of the flexible connecting spring $d$, the cavity beneath the latter being sufficient in depth to allow the spring $d$ to be depressed to a level with the flat surface of $b$, and the cavity for the reception of the conductor being slightly smaller than the insulating covering $i$, so that when associated with the piece $c$, which is also of semi-cylindrical form, and cut away internally as shown, and the whole forced into the tube $a$, the insulating covering $i$ will be compressed and firmly gripped between the parts $b$ and $c$. The connecting spring $d$ is firmly secured to the piece $b$ by two screws, as shown, one of said screws serving also to secure the end of the conductor $w$, and to bring the latter into close and firm electrical contact with the spring $d$.

The parts $a$, $b$, and $c$ may be made of any convenient non-conducting material, having the requisite physical and chemical properties to fit it for the special use and circumstances of the particular case in question. Among such materials are wood, vulcanite, vulcanized fiber, and others well known in the art to which this invention pertains. The spring $d$ may be of brass or any other convenient conducting material, of sufficient resiliency to adapt it to the purposes of a spring, as that word is commonly understood. The parts $b$ and $c$ may be retained within the tube $a$ simply by the friction due to a close fitting of the parts, or by a set screw or screws, passing through the wall of the tube $a$, and abutting against or entering the substance of the parts $b$ and $c$, or either of them, or by any of the equivalent means well known in the art, provided only that the screws or pins or other devices for the purpose, if of metal, shall be so placed, or so limited in length, that they shall not form a conducting connection from the conductor $w$, or the spring $d$, or the screws or other metallic parts in contact therewith, to the exterior of the connector. The spring $d$ is so formed, that when two connectors are pushed together, the end of one spring, as $d$, may easily pass the end of the opposing spring, as $d$, and when fully engaged, may lock over it, as shown in Fig. 1, so as to oppose a sufficient resistance to separation to prevent accidental disengagement of the connectors.

In all the figures the letters distinguished by a subscript (1) denote the parts of the connector on the right of the drawings which correspond to, and are identical in form with, the parts of the connector on the left which are designated by similar letters, each complete connector, and every part of the same, being respectively identical with every other connector of the same size and class, and with the corresponding parts of the same.

The essential point in the construction of the device is, that the portion of the connector which is intended to inclose the connecting spring, and to engage with another similar connector, shall be so formed that the portion of the transverse section on one side of a medial, longitudinally dividing surface shall be the exact negative or complement of the portion on the other side of said medial surface, and that the portions of the connector separated by said medial surface shall together form a practically complete straight tube, inclosing the connecting spring. Thus in the form shown, the semi-cylindrical piece $b$ is exactly negatived by the vacant half of the tube $a$, on the opposite side of the medial plane, and the half of the tube $a$ remaining on the side opposite to $b$ is negatived by the space left by cutting away the portion of $a$ on the same side with $b$, while the piece $b$ and the opposing portion of $a$ together form a tube of semi-circular cross section, inclosing the connecting spring $d$.

Obviously, the cylindrical form is not essential, as a connector identical in principle and use could just as well be made whose transverse section should be square, oval, or of any other form admitting of division into two parts, each the negative or complement of the other, and together serving to inclose a conducting spring.

The ends of two opposing conductors being armed with two similar connectors, of the kind described, the operation of connecting them together consists in placing the two connectors as shown in Fig. 5, and forcing them together in a longitudinal direction. Disconnection is accomplished by reversing the motion, so as to pull the two connectors apart.

Having thus described the construction and operation of my device, what I claim as new and useful, and desire to protect by Letters Patent, is—

An electrical connector consisting of an inclosing tube, the interior cross-section of which may be divided into two similar and equal parts, two pieces of unequal length each filling one of such parts, and a contact making device attached to and within the longer of these pieces, the half of the circumference of the inclosing tube next to and around said longer piece being cut away through a portion of its length and the opposing half forming with the longer interior piece a tube inclosing the contact piece throughout its length.

In testimony that I claim the foregoing as my invention I have signed my name, in presence of two witnesses, this 5th day of July, 1894.

JOHN B. HENCK, JR.

Witnesses:
W. P. COMBES,
F. L. BROWN.